(12) United States Patent
Luo et al.

(10) Patent No.: US 11,310,644 B2
(45) Date of Patent: *Apr. 19, 2022

(54) WIRELESSLY UTILIZABLE MEMORY

(71) Applicant: Micron Technology, Inc., Boise, ID (US)

(72) Inventors: Fa-Long Luo, San Jose, CA (US); Glen E. Hush, Boise, ID (US); Aaron P. Boehm, Boise, ID (US)

(73) Assignee: Micron Technology, Inc., Boise, ID (US)

(*) Notice: Subject to any disclaimer, the term of this patent is extended or adjusted under 35 U.S.C. 154(b) by 9 days.

This patent is subject to a terminal disclaimer.

(21) Appl. No.: 16/988,971

(22) Filed: Aug. 10, 2020

(65) Prior Publication Data
US 2020/0374678 A1    Nov. 26, 2020

Related U.S. Application Data

(63) Continuation of application No. 16/142,013, filed on Sep. 26, 2018, now Pat. No. 10,779,145.

(51) Int. Cl.
*G06F 3/06* (2006.01)
*H04W 4/70* (2018.01)
(Continued)

(52) U.S. Cl.
CPC .............. *H04W 4/70* (2018.02); *G06F 3/061* (2013.01); *G06F 3/0659* (2013.01);
(Continued)

(58) Field of Classification Search
CPC ...... G06F 3/06–0689; G06F 2003/0691–0698; G06F 13/10–4295;
(Continued)

(56) References Cited

U.S. PATENT DOCUMENTS 5,894,266 A    4/1999   Wood, Jr
7,917,599 B1   3/2011   Gopalan et al.
(Continued)

OTHER PUBLICATIONS

Choi, et al. "A Remote Memory System for High Performance Data Processing", International Journal of Future Computer and Communications, vol. 4, No. 1, Feb. 2015, 5 pp.
(Continued)

*Primary Examiner* — Timothy J Weidner
(74) *Attorney, Agent, or Firm* — Brooks, Cameron & Huebsch, PLLC

(57) ABSTRACT

Methods, apparatuses, and systems related to wireless main memory for computing are described. A device may include a processor that is wirelessly coupled to a memory array, which may be in a physically separate device. The processor may execute instructions stored in and wirelessly communicated from the memory array. The processor may read data from or write data to the memory array via a wireless communication link (e.g., using resources of an ultra high frequency, super high frequency, and/or extremely high frequency band). Several devices may have a small amount of local memory (or no local memory) and may share, via a wireless communication link, a main memory array. Memory devices may include memory resources and transceiver resources; they may be configured to use one or several communication protocols over licensed or shared frequency spectrum bands, directly (e.g., device-to-device) or indirectly (e.g., via a base station).

18 Claims, 4 Drawing Sheets

(51) Int. Cl.
*H04W 72/04* (2009.01)
*H04W 72/12* (2009.01)
*H04W 74/02* (2009.01)
*H04W 74/04* (2009.01)
*H04W 74/08* (2009.01)
*H04W 76/14* (2018.01)
*H04W 88/06* (2009.01)
*H04W 92/18* (2009.01)

(52) U.S. Cl.
CPC ...... *G06F 3/0673* (2013.01); *H04W 72/0453* (2013.01); *H04W 72/1205* (2013.01); *H04W 72/1215* (2013.01); *H04W 72/1289* (2013.01); *H04W 74/02* (2013.01); *H04W 74/04* (2013.01); *H04W 74/08* (2013.01); *H04W 76/14* (2018.02); *H04W 88/06* (2013.01); *H04W 92/18* (2013.01)

(58) Field of Classification Search
CPC ............... G06F 2212/10–7211; G06F 2213/0002–4004; H04B 1/38–588; H04L 5/003–0098; H04L 12/40–417; H04L 2012/40208–40293; H04W 4/06–80; H04W 8/18–245; H04W 16/02–16; H04W 28/02–14; H04W 40/005–38; H04W 56/001–0025; H04W 72/005–14; H04W 74/002–0891; H04W 76/10; H04W 76/14; H04W 76/20; H04W 76/23; H04W 76/40; H04W 76/45; H04W 80/02; H04W 80/08–12; H04W 84/005–02; H04W 84/04–047; H04W 84/10; H04W 84/12; H04W 84/18–22; H04W 88/02; H04W 88/04; H04W 88/06–12; H04W 92/02–04; H04W 92/08–12; H04W 92/16–22

See application file for complete search history.

(56) References Cited

U.S. PATENT DOCUMENTS

| | | | |
|---|---|---|---|
| 8,306,525 | B2 | 11/2012 | Feher |
| 9,497,572 | B2 | 11/2016 | Britt et al. |
| 10,779,145 | B2 * | 9/2020 | Luo .................. H04W 76/14 |
| 10,785,786 | B2 * | 9/2020 | Luo .................. H04W 72/1289 |
| 2009/0144388 | A1 | 6/2009 | Gross et al. |
| 2011/0038378 | A1 | 2/2011 | Carter |
| 2014/0274084 | A1 * | 9/2014 | Ross .................. H04W 28/14 |
| 2015/0215435 | A1 | 7/2015 | Hillan |
| 2018/0106618 | A1 | 4/2018 | Cerchio |
| 2018/0234518 | A1 * | 8/2018 | Zhu .................. H04W 76/14 |
| 2018/0288152 | A1 | 10/2018 | Chagam Reddy |
| 2018/0310237 | A1 | 10/2018 | Kumar |
| 2019/0045498 | A1 | 2/2019 | Huang |
| 2019/0182179 | A1 | 6/2019 | Pak |
| 2019/0253955 | A1 | 8/2019 | Abedini |
| 2019/0354506 | A1 * | 11/2019 | Bruner .............. G06F 15/17331 |
| 2020/0100270 | A1 | 3/2020 | Luo |

OTHER PUBLICATIONS

"5G Network Architecture—A High-Level Perspective" Huawei Technologies, Co., Ltd., Bantian Longgang District, Shenzhen, China, 2016, 21 pp.

* cited by examiner

WIRELESSLY UTILIZABLE MEMORY

PRIORITY INFORMATION

This application is a Continuation of U.S. application Ser. No. 16/142,013, filed Sep. 26, 2018, the contents of which are incorporated herein by reference.

TECHNICAL FIELD

The present disclosure relates generally to semiconductor memory and methods, and more particularly, to apparatuses, systems, and methods for a wirelessly utilizable memory.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random access memory (DRAM), static random access memory (SRAM), synchronous dynamic random access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random access memory (RRAM), ferroelectric random access memory (FeRAM), and magnetoresistive random access memory (MRAM), such as spin torque transfer random access memory (STT RAM), among other types.

Electronic systems often include a number of processing resources (e.g., one or more processors), which may retrieve instructions from a suitable location and execute the instructions and/or store results of the executed instructions to a suitable location (e.g., the memory resources). A processor can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., NOT) logical operations on data (e.g., one or more operands). For example, functional unit circuitry may be used to perform arithmetic operations such as addition, subtraction, multiplication, and division on operands via a number of operations.

DETAILED DESCRIPTION

Figure 1:
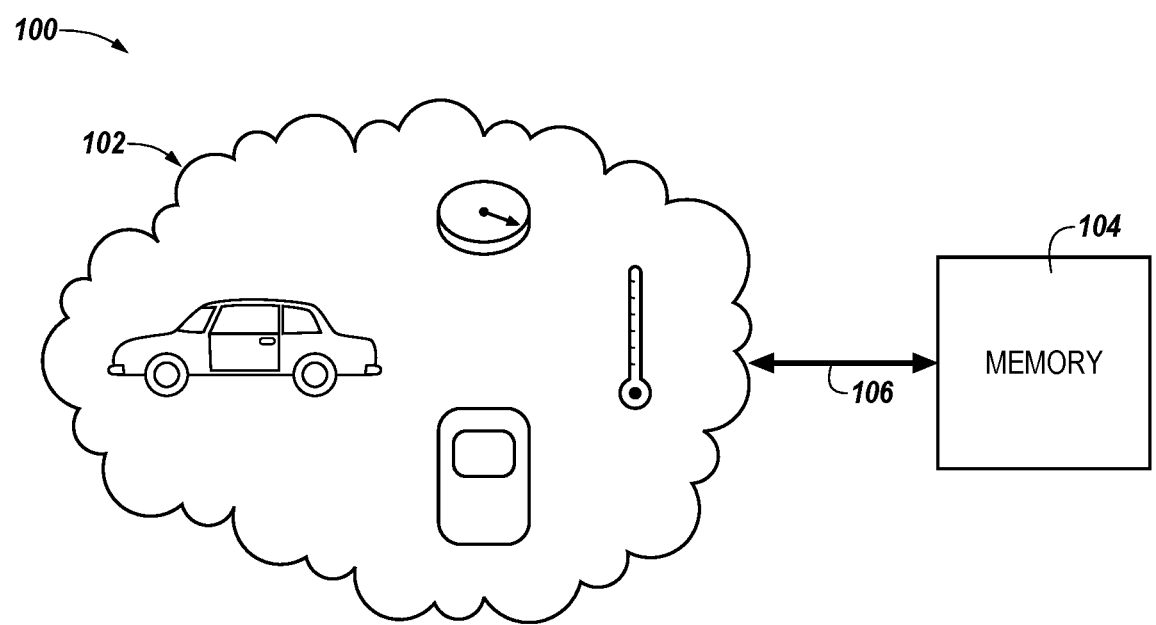
FIG. 1 is a diagram illustrating an example system including a wireless memory device in accordance with a number of embodiments of the present disclosure.

The present disclosure includes apparatuses, systems, and methods associated with a wirelessly utilizable memory. A device may include a processor that is wirelessly coupled to a memory array. The processor may execute instructions stored in, and wirelessly communicated from, the memory array. The processor may read data from or write data to the memory array via a wireless communication link (e.g., using resources of an ultra high frequency (UHF), super high frequency (SHF), or extremely high frequency (SHF), and/or tremendously high frequency (THF) band). In some examples, several devices may have a small amount of local memory (or no local memory) and may share a main memory array, and the various devices may communicate with one another via respective wireless communication links. Memory devices may include controllers, memory resources, and/or transceiver resources; they may be configured to use one or several communication protocols over licensed or shared frequency spectrum bands, directly (e.g., device-to-device) or indirectly (e.g., via a base station).

In a number of embodiments, an apparatus includes memory, a transceiver, and a controller coupled to the memory and the transceiver. The controller may be configured to communicate, via the transceiver resource, data stored in the memory via a communication link in an extremely high frequency (EHF) band. The apparatus may be configured to read data to and write data from a remote processor via the communication link in the EHF band.

A computing device may be utilized to perform various types of operations. To contribute to such performance, a faster processing resource and/or more memory resources may be combined on a particular computing device. However, a cost associated with the computing device implemented with the processing resource and/or the memory resources may outweigh benefits obtainable from utilizing the computing device, especially when a function the computing device is designed to perform is substantially simple, for example, as compared to a bandwidth at which the processing resource along with the corresponding memory resources may need to provide to perform the function.

As an example, consider a plant watering device that automatically waters plants when needed. In this example, the plant watering device may need a sensing module to detect, for example, a humidity of the plants, a communication module (e.g., transceiver resources), controlling module that controls water valves, a processing resource (e.g., Central Processing Unit (CPU)) that controls those modules, and/or memory resources to store data associated with those modules. The cost associated with the plant watering device may substantially outweigh the benefits from utilizing the plant watering device that performs comparatively simple functions, which would make utilization of such devices impractical.

Accordingly, embodiments of the present disclosure provide various benefits such as a reduced design complexity, less power, and/or reducing cost associated with network devices. Further, while maintaining the reduced design complexity and less power consumption, embodiments of the present disclosure can also provide competitive approaches for communicating among the network devices, in which network devices may communicate with each other as if other network devices were local (e.g., physically coupled) to each other.

A computing device can be a network device. As used herein, "network device" refers to a computing device that is configured to transmit and/or receive signals (e.g., data) and to process the received signals. For example, network devices may include data processing equipment such as a computer, cellular phone, Internet-of-Things (IoT), personal digital assistant, tablet devices, an access point (AP), and/or data transfer devices such as network switches, routers, controllers, although embodiments are not so limited.

The figures herein follow a numbering convention in which the first digit or digits of a reference number correspond to the figure number and the remaining digits identify an element or component in the figure. Similar elements or components between different figures may be identified by the use of similar digits. For example, 102 may reference element "02" in FIG. 1, and a similar element may be referenced as 302 in FIG. 3.

FIG. 1 is a diagram illustrating an example system 100 including a wireless memory device 104 in accordance with a number of embodiments of the present disclosure. The system 100 include a network device (e.g., network devices 102) and a wireless memory device 104. As used herein, "a wireless memory device" refers to a memory device that can be wirelessly coupled to an entity utilizing the wireless memory device such that the wireless memory device is utilized by the entity via a wireless communication technology.

As illustrated in FIG. 1, the system 100 includes a plurality of network devices 102. By way of example and not by way of limitation, at least a portion of the plurality of network devices 102 may be IoT enabled devices. As used herein, "IoT enabled devices" include physical devices, vehicles, home appliances, and other devices embedded with electronics, software, sensors, actuators, and/or network connectivity which enables such devices to connect to a network and/or exchange data. Examples of IoT enabled devices include wearable technologies, smart home devices, intelligent shopping systems, and monitoring devices, among other cyber-physical systems. In addition, the plurality of network devices 102 may include a processing resource to execute instruction such as instruction corresponding to an operating system to provide common services for applications running on the computing system. Although FIG. 1 illustrated a plurality of network devices 102, embodiments are not so limited. As an example, the system 100 may include an individual network device 102 that communicates with the wireless memory device 104.

As shown in FIG. 1, at least one of the network devices 102, or a processing resource thereof, may be wirelessly coupled to the wireless memory device 104 and may be configured to communicate with the wireless memory device 104 via a communication link 106. In some embodiments, the communication link 106 may be a part of a device-to-device communication technology operable in an extremely high frequency (EHF) band. As used herein, the device-to-device communication refers to a wireless communication performed directly between a transmitting device and a receiving device, as compared to a wireless communication such as the cellular telecommunication (e.g., communication via a base station) and/or those communications, in which network devices communicate with each other by firstly going through an intermediate network device (e.g., base station and/or AP). In some embodiments, the device-to-device communication may rely on existing infrastructures (e.g., network entity such as a base station); therefore, can be an infrastructure mode. For example, as described herein, the device-to-device communication whose transmission timing is scheduled by a network entity such as a base station can be an infrastructure mode. In some embodiments, the receiving and transmitting devices may communicate in the absence of the existing infrastructures; therefore, can be an ad-hoc mode. As used herein, "an infrastructure mode" refers to an 802.11 networking framework in which devices communicate with each other by first going through an intermediary device such as an AP. As used herein, "ad-hoc mode" refers to an 802-11 networking framework in which devices communicate with each other without the use of intermediary devices such as an AP. The term "ad-hoc mode" can also be referred to as "peer-to-peer mode" or "independent Basic Service Set (IBSS)."

As used herein, the cellular telecommunication refers to a wireless communication performed indirectly between a transmitting device and a receiving device via a base station, as compared to those types of wireless communications including a device-to-device communication. Cellular telecommunications may be those that use resources of a frequency spectrum restricted or regulated by a governmental entity. License frequency spectrum resources may be scheduled for use or access by certain devices, and may be inaccessible to other devices. By contrast, resources of shared or unlicensed frequency spectrum may be open and available for use by many devices without the necessity of a governmental license. Allocating licensed and shared or unlicensed frequency resources may present different technical challenges. In the case of licensed frequency spectrum, resources may be controlled by a central entity, such as a base station or entity within a core network. While devices using resources of shared or unlicensed frequency spectrum may contend for access—e.g., one device may wait until a communication channel is clear or unused before transmitting on that channel. Sharing resources may allow for broader utilization at the expense of guaranteed access.

Techniques described herein may account for, or may use, both licensed and unlicensed frequency spectrum. In some communication schemes, device-to-device communication may occur on resources of a licensed frequency spectrum, and such communications may be scheduled by a network entity (e.g., a base station). Such schemes may include certain 3GPP-developed protocols, like Long-Term Evolution (LTE) or New Radio (NR). A communication link (e.g., communication link 106) between devices (e.g. user equipments (UEs)) in such schemes may be referred to as sidelink (e.g., device-to-device communication link), while a communication link from a base station to a device may be referred to as a downlink and a communication from a device to a base station may be referred to as an uplink.

In other schemes, device-to-device communication may occur on resources of unlicensed frequency spectrum, and devices may contend for access the communication channel or medium. Such schemes may include WiFi or MulteFire. Hybrid schemes, including licensed-assisted access (LAA) may also be employed.

As used herein, an EHF band refers to a band of radio frequencies in an electromagnetic spectrum ranging from 30 to 300 gigahertz (GHz) as designated by the International Telecommunication Union (ITU), and as described further herein. Ranges of radio frequencies as designated by the ITU can include extremely low frequency (ELF) band ranging from 3 to 30 Hz, super low frequency (SLF) band ranging from 30 Hz to 300 Hz, ultra low frequency (ULF) band ranging from 300 Hz to 3 kilohertz (kHz), very low frequency (VLF) band ranging from 3 to 30 kHz, low frequency (LF) band ranging from 30 kHz to 300 kHz, medium frequency (MF) band ranging from 300 kHz to 3 megahertz (MHz), high frequency (HF) band ranging from 3 MHz to 30 MHz, very high frequency (VHF) band ranging from 30 MHz to 300 MHz, ultra high frequency (UHF) band ranging from 300 MHz to 3 GHz, super high frequency (SHF) band ranging from 3 GHz to 30 GHz, extremely high frequency (EHF) band ranging from 30 GHz to 300 GHz, and tremendously high frequency (THF) band ranging from 0.3 to 3 terahertz (THz).

The communication 106 operable in the EHF band can include a fifth generation (5G) technology or later technology. 5G technology may be designed to utilize a higher frequency portion of the wireless spectrum, including an EHF band (e.g., ranging from 30 to 300 GHz as designated by the ITU). 5G may refer to protocols and specifications like New Radio (NR) developed by 3GPP.

A number of embodiments of the present disclosure can provide various benefits by utilizing a network communication that is operable in a number of frequency bands including a higher frequency portion (e.g., EHF) of the wireless spectrum, as compared to those network communication technologies that utilizes a lower frequency portion of the wireless spectrum only. As an example, the EHF bands of 5G technology may enable data to be transferred more rapidly than technologies (e.g., including previous generations of cellular telecommunication technologies) using lower frequency bands only. For example, a 5G network is estimated to have transfer speeds up to hundreds of times faster than a 4G network, which may enable data transfer rates in a range of tens of megabits per second (MB/s) to tens of GB/s for tens of thousands of users at a time (e.g., in a memory pool, as described herein) by providing a high bandwidth. For example, a 5G network provides faster transfer rates than the 802.11-based network such as WiFi that operate on unlicensed 2.4 GHz radio frequency band (e.g., Ultra High Frequency (UHF) band). Accordingly, a number of embodiments can enable the wireless memory device 104 to be used at a high transfer speed as if the wireless memory device 104 were wired to the network devices 102.

A number of embodiments are not limited to a particular type of a wireless communication (e.g., communication 106). For example, the various types of communication technologies the network devices 102 and/or the wireless memory device 104 can utilize may include, for example, cellular telecommunication including different generations of broadband cellular telecommunication technologies, device-to-device to communication including Bluetooth, Zigbee, and/or 5G (e.g., device-to-device communication operable in an EHF band), and/or other wireless communication utilizing an intermediary device (e.g., WiFi utilizing an AP).

In a number of embodiments, the wireless memory device 104 may be utilized, by the network devices 102, for various purposes. In some embodiments, the wireless memory device 104 can serve as a wireless main memory for the network devices 102, which may improve practicability of the network devices 102, for example, as IoT enabled devices, as described further herein (e.g., in connection with FIG. 2).

Figure 2:
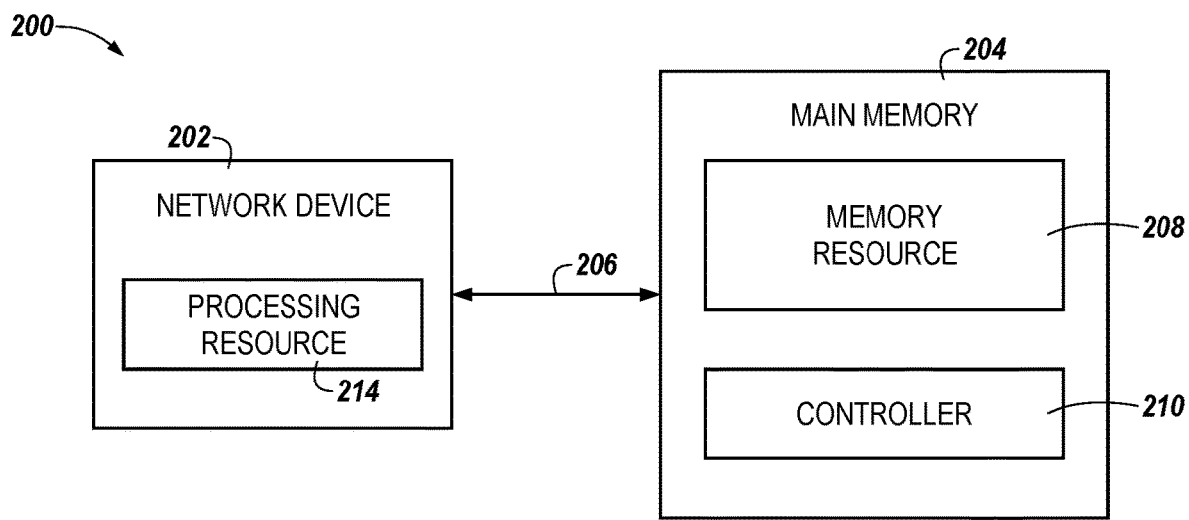
FIG. 2 is a diagram illustrating an example system including a wireless main memory in accordance with a number of embodiments of the present disclosure.

FIG. 2 is a diagram illustrating an example system 200 for a wireless main memory 204 in accordance with a number of embodiments of the present disclosure. As shown in FIG. 2, the system 200 includes a network device 202 and a wireless main memory 204 of the network device 202. The network device 202 and the wireless main memory 204 are analogous to one of the network devices 102 and the wireless memory device 104, respectively, as described in connection with FIG. 1. The network device 204 is wirelessly coupled to the wireless main memory 204 via a communication technology.

The wireless main memory 204 can serve as a main memory for the network device 202. As used herein, "a main memory" refers to memory that is directly accessible by a host. As an example, the main memory may store data that can be directly manipulated by a host processor.

The wireless main memory 204 may provide functions that would have been provided by an internal main memory (e.g., a main memory internal to a network device) while being external to the network device 202. For example, those data and/or instructions that would have been communicated between a processing resource (e.g., processing resource 214) and the internal main memories may be communicated via a communication link 206. As such, the network device 202 may not include, in addition to the wireless main memory 204, a main memory internally (e.g., local main memory). As used herein, the terms "processing resource" and "processor" are used interchangeably herein and can have the same meaning, as appropriate to the context. For example, the term "remote processor" can indicate a processor in the network device 202 that can wirelessly communicate with the wireless main memory 204.

Having a main memory (e.g., main memory 204) external to and wirelessly coupled to a network device (e.g., network device 202) can provide benefits such as reducing design complexity of the network device 202, reducing power consumption for the network device 202, and/or reducing cost associated with the network device 202. For example, implementing a main memory within each of the network devices may cause an increase in a design complexity and a manufacturing cost, and/or a shortened battery life due to a power exhaustion by an internal main memory, which may prevent practical implementation of those network devices when the cost associated with the network devices outweighs benefits obtainable from utilizing the network devices. As such, a number of embodiments can offer a practical implementation of a system (e.g., system 200) by eliminating a need to have a main memory internal to the network device, which can reduce a cost associated with the network device.

The wireless main memory 204 can include a memory resource 208 and a controller 210. The memory resource 208 may store data that can be directly accessible by the processing resource 214 via the communication link 206. The memory resource 208 may include a number of volatile memory devices formed and/or operable as DRAM, among other types of volatile memory devices. However, embodiments are not so limited. For example, the memory resource 212 of FIG. 2 may include a plurality of memory devices such as a number of volatile memory devices formed and/or operable as RAM, DRAM, SRAM, SDRAM, and/or TRAM, among other types of volatile memory devices. For example, the memory resource 212 of FIG. 2 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices. As used herein, the terms "memory resource" and "memory" are used interchangeably herein and can have the same meaning, as appropriate to the context.

The controller may be configured to, responsive to a command received from the processing resource 214, corresponding data stored in the memory resource 208 with the processing resource 214 via the communication link 206 (e.g., a device-to-device communication that is operable in the EHF band). The command may be in the form of read and/or write commands, which may be referred to as load and store commands respectively. Further details associated with the memory resource 208 and the controller 210 are described in connection with FIG. 4.

As shown in FIG. 2, the processing resource 214 (e.g., CPU) may be wirelessly coupled to a memory resource such as the main memory 204 (e.g., via a communication link 206). The processing resource 214 may be configured to communicate with the memory resource 208 via various communication technologies such as a device-to-device communication technology that is operable in the EHF band (e.g., device-to-device communication using the 5G technology). However, embodiments are not limited to a particular communication technology via which the processing resource 214 can be configured to communicate. As an example, the communication technology that can be utilized by the processing resource 214 may include a device-to-device communication (e.g., 5G, Bluetooth, Zigbee, etc.), a cellular telecommunication (e.g., 0-5G), and/or other types of wireless network communications such as WiFi (e.g., 802.11-based network communication).

In addition to the EHF band, the communication technology of the communication link 206 can also be operable in other frequency bands such as the SHF band and the UHF band. As an example, the communication technology of the communication link 206 can operate in a frequency band below 2 GHz (e.g., low 5G frequencies) and/or in a frequency band between 2 GHz and 6 GHz (e.g., medium 5G frequencies) in addition to a frequency band above 6 GHz (e.g., high 5G frequencies). Further details of a number of frequency bands (e.g., below 6 GHz) in which the 5G technology can operate are defined in Release 15 of the Third Generation Partnership Project (3GPP) as New Radio (NR) Frequency Range 1 (FR1), as shown in Table 1.

TABLE 1

5G operating bands for FR1

| NR Operating Band | Frequency Band (MHz) | Duplex Mode |
|---|---|---|
| n1 | 1920-1980; 2110-2170 | FDD |
| n2 | 1850-1910; 1930-1990 | FDD |
| n3 | 1710-1785; 1805-1880 | FDD |
| n5 | 824-849; 869-894 | FDD |
| n7 | 2500-2570; 2620-2690 | FDD |
| n8 | 880-915; 925-960 | FDD |
| n20 | 791-821; 832-862 | FDD |
| n28 | 703-748; 758-803 | FDD |

TABLE 1-continued 5G operating bands for FR1

| NR Operating Band | Frequency Band (MHz) | Duplex Mode |
|---|---|---|
| n38 | 2570-2620 | TDD |
| n41 | 2496-2690 | TDD |
| n50 | 1432-1517 | TDD |
| n51 | 1427-1432 | TDD |
| n66 | 1710-1780; 2110-2200 | FDD |
| n70 | 1695-1710; 1995-2020 | FDD |
| n71 | 617-652; 663-698 | FDD |
| n74 | 1427-1470; 1475-1518 | FDD |
| n75 | 1432-1517 | SDL |
| n76 | 1427-1432 | SDL |
| n78 | 3300-3800 | TDD |
| n77 | 3300-4200 | TDD |
| n79 | 4400-5000 | TDD |
| n80 | 1710-1785 | SUL |
| n81 | 880-915 | SUL |
| n82 | 832-862 | SUL |
| n83 | 703-748 | SUL |
| n84 | 1920-1980 | SUL |

Further, details of a number of frequency bands (e.g., above 6 GHz) in which the 5G technology can operate are defined in Release 15 of the 3GPP as NR Frequency Range 2 (FR2), as shown in Table 2.

TABLE 2

5G operating bands for FR2

| NR Operating Band | FREQUENCY BAND (MHz) | Duplex Mode |
|---|---|---|
| n257 | 26500-29500 | TDD |
| n258 | 24250-27500 | TDD |
| n260 | 37000-40000 | TDD |

In some embodiments, a number of frequency bands in which a communication technology (e.g., device-to-device communication and/or cellular telecommunication using 5G technology) utilized by the processing resource 214 may be operable can further include the THF band in addition to those frequency bands such as the SHF, UHF, and EHF bands.

As used herein, FDD stands for frequency division duplex, TDD stands for time division duplex, SUL stands for supplementary uplink, and SDL stands for supplementary downlink. FDD and TDD are each a particular type of a duplex communication system. As used herein, a duplex communication system refers to a point-to point system having two connected parties and/or devices that can communicate with one another in both directions. TDD refers to duplex communication links where uplink is separated from downlink by the allocation of different time slots in the same frequency band. FDD refers to a duplex communication system, in which a transmitter and receiver operate at different frequency bands. SUL/SDL refer to a point-to-point communication system having two connected parties and/or devices that can communicate with one another in a unilateral direction (e.g., either via an uplink or a downlink, but not both).

The communication technology of the communication link 206 may be selectively operable in one or more of low, medium, and/or high 5G frequency bands based on characteristics of, for example, the communication link 206. As an example, the low 5G frequency may be utilized in some use cases (e.g., enhanced mobile broadband (eMBB), ultra-reliable and low-latency communications (URLLC), massive machine-type communications (mMTC)), in which extremely wide area needs to be covered by the 5G technology for the communication link 206. As an example, the medium 5G frequency may be utilized in some use cases (e.g., eMBB, URLLC, mMTC), in which higher data rate than that of the low 5G frequencies is desired for the communication link 206. As an example, the high 5G frequency may be utilized in some use cases (e.g., eMBB), in which extremely high data rate is desired for the communication link 206.

As used herein, eMBB, URLLC, mMTC each refers to one of three categories of which the ITU has defined as services that the 5G technology can provide. As defined by the ITU, eMBB aims to meet the people's demand for an increasingly digital lifestyle and focuses on services that have high requirements for bandwidth, such as high definition (HD) videos, virtual reality (VR), and augmented reality (AR). As defined by the ITU, URLLC aims to meet expectations for the demanding digital industry and focuses on latency-sensitive services, such as assisted and automated driving, and remote management. As defined by the ITU, mMTC aims to meet demands for a further developed digital society and focuses on services that include high requirements for connection density, such as smart city and smart agriculture.

As used herein, a channel bandwidth refers to a frequency range occupied by data and/or instructions when being transmitted (e.g., by an individual carrier) over a particular frequency band. As an example, a channel bandwidth of 100 MHz may indicate a frequency range from 3700 MHZ to 3800 MHZ, which can be occupied by data and/or instructions when being transmitted over n77 frequency band, as shown in Table 1. As indicated in Release 15 of the 3GPP, a number of different channel bandwidth such as a channel bandwidth equal to or greater than 50 MHz (e.g., 50 MHz, 100 MHz, 200 MHz, and/or 400 Mhz) may be utilized for the 5G technology.

Figure 3:
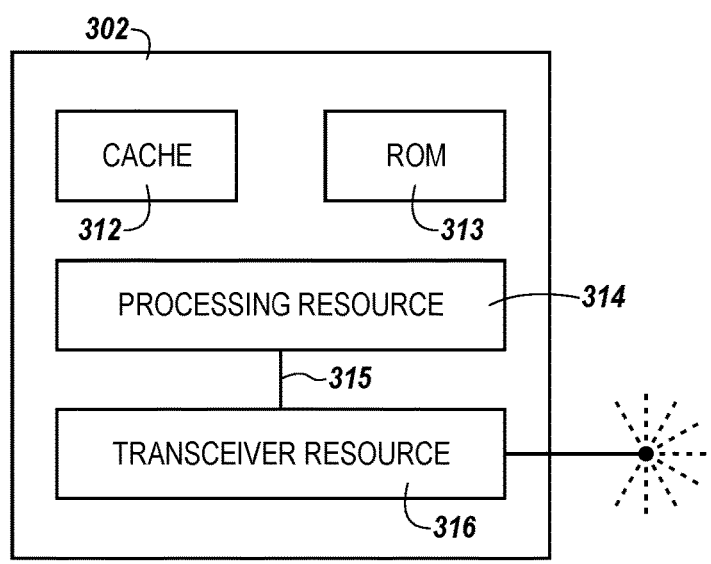
FIG. 3 is a schematic diagram illustrating an example network device including a processing resource, a transceiver resource, cache, and a read-only memory (ROM) in accordance with a number of embodiments of the present disclosure.

FIG. 3 is a schematic diagram illustrating an example network device 302 including a processing resource 314, a transceiver resource 316, a cache 312, and a ROM 313 in accordance with a number of embodiments of the present disclosure. The example network device 302 may analogous to the network device 102 and 202 (e.g., IoT device). As described in connection with FIG. 2, the network device 302 may be wirelessly coupled to a main memory and utilize, without having an internal main memory, the wireless main memory as if the wireless main memory were local (e.g., physically coupled) to the network device 302.

The network device 302 may include a cache 312. The cache 312 may include memory (e.g., memory cells) arranged, for example, in a number of bank groups, banks, bank sections, subarrays, and/or rows of a number of memory devices. The cache may be SRAM, although embodiments are not so limited. The cache 312 stores copy of data stored in a wireless main memory.

The network device 302 may include a ROM 313 that stores instructions executable by the processing resource 314. The ROM 313 may store a set of basic instructions directing the processing resource 314 for performing various functions. As an example, the set of basic instructions executed by the processing resource 314 may cause the processing resource 314 to utilize a transceiver resource 316 to communicate with a wireless main memory, retrieve data and/or a set of instructions from the wireless main memory, and/or execute the set of instructions retrieved from the wireless main memory, although embodiments are not so limited.

A processing resource 314 may be a CPU of the network device 302. As a CPU of the network device 302, the processing resource 314 may be configured to access and retrieve data and/or instructions stored in a wireless main memory (e.g., wireless memory device 104), execute the instructions retrieved from the wireless main memory, communicate data (e.g., data obtained as a result of the execution of the retrieved instructions) with the wireless main memory and/or other devices. As such, the network device 302 may not include a local main memory (e.g., main memory located internal to and/or wired to the processing resource 314).

In some embodiments, the processing resource 314 may be configured to enter periodically into different statuses. As an example, the processing resource 314 may be configured to enter periodically into a first status (e.g., active mode) to enable a wireless communication between the processing resource 314 and a wireless main memory (e.g., wireless memory device 104) during the first status. While not being in the periodic first status, the processing resource 314 may be configured to enter into a second status (e.g., sleep mode) such that the processing resource 314 and/or the network device 302 may consume less power than it would have consumed while being in the first status. For example, a nominal power consumption of the second status is lower than a nominal power consumption of the first status. Accordingly, the network device 302 such as the IoT enabled devices may provide a mechanism that prolong a battery life of the IoT enabled devices by reducing unnecessary power consumption. Ordinal numbers such as first and second and/or primary and secondary are used herein to assist in correlating and/or distinguishing between similar and/or selectably coupled components (e.g., portions of data, and/or data caches, etc.) and are not used to indicate a particular ordering and/or relationship between the components, unless the context clearly dictates otherwise (e.g., by using terms such as adjacent, etc.).

Although not shown in FIG. 3, the cache 312 and ROM 313 may be coupled to the processing resource 314, for example, via a bus for communicating data between the cache 312 and/or ROM 313 and the processing resource 314. For example, the processing resource 314 may request particular data values stored in the cache 312 and/or ROM 313 and the data values may be retrieved from the cache 312 and/or ROM 313 to the processing resource 314 via the bus. For example, the processing resource 314 may receive instructions retrieved from a wireless memory resource (not shown) and send those instructions to the cache 312 via the bus.

The processing resource 314 may be coupled to a transceiver resource 316 via bus 315. The transceiver resource 316 may be configured to wirelessly share data with other devices, and the processing resource 314 may be configured to communicate with a wireless main memory via the transceiver resource 316. As used herein, the terms "transceiver resource" and "transceiver" are used interchangeably herein and can have the same meaning, as appropriate to the context.

As used herein, a "transceiver" may be referred to as a device including both a transmitter and a receiver. In a number of embodiments, the transceiver resource 316 may be and/or include a number of radio frequency (RF) transceivers. The transmitter and receiver may, in a number of embodiments, be combined and/or share common circuitry. In a number of embodiments, no circuitry may be common between the transmitter and receiver and the device may be termed a transmitter-receiver. Other devices consistent with the present disclosure may include transponders, transverters, and/or repeaters, among similar devices.

As described in connection with FIG. 1, the network device 302 (e.g., processing resource 314) may be configured to communicate, via the transceiver resource 316, with other devices via a communication that is operable in an EHF band. In a number of embodiments, a communication technology that can be utilized for communication 106 between the network devices 102 and the wireless memory device 104 may be a device-to-device communication using 5G technology. Stated differently, 5G cellular telecommunication may also be in a form of a device-to-device communication, in which data are communicated directly between a transmitting device and a receiving device.

Implementing 5G technology in a form of a device-to-device communication may provide various benefits such as reducing a design complexity of an apparatus (e.g., network devices 102 and/or wireless memory device 104) and/or providing a network communication via which network devices 102 and 202 may communicate with wireless main memory 104 and 204 as if the network devices 102 and 202 were local (e.g., physically coupled) to the wireless main memory 104 and 204. As an example, consider network devices in previous approaches, in which the network devices utilize a device-to-device communication as well as a cellular telecommunication that routes data firstly through an intermediary device (e.g., base station, AP, etc.). The network devices in those previous approaches may include at least two different transceivers (e.g., each for the device-to-device communication and the cellular telecommunication) because each type of communication may utilize different network protocols that would further necessarily utilize unique transceivers. As such, the network devices implemented with different transceivers would increase a design (e.g., structural) complexity that may increase costs associated with the network devices. On the other hand, a number of embodiments of the present disclosure may reduce a design complexity of the network device 302 (e.g., network device) by eliminating a need of having different transceivers for different types of network communication technologies such as a device-to-device communication and a cellular telecommunication. Instead, the network device 302 can have an individual transceiver for different types of network communication technologies, which would reduce a structural complexity of the network device 302; thereby, reducing cost associated with the network device 302.

In some examples, the transceiver resource 316 may be wirelessly couplable to a base station (e.g., base station 532 as illustrated in and described in connection with FIG. 5). As used herein, "a base station" refers to a land station (e.g., including a telecommunication tower) in a mobile service (e.g., according to ITU Radio Regulations). The term may be used in the context of mobile telephony, wireless computer networking, and/or other wireless communications, as further described in connection with FIG. 5.

Figure 4:
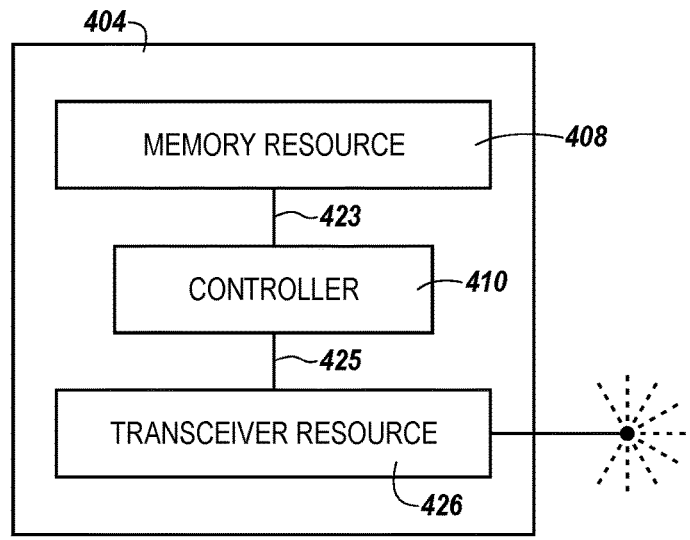
FIG. 4 is a schematic diagram illustrating an example apparatus including a transceiver resource, a controller, and a wirelessly utilizable memory resource in accordance with a number of embodiments of the present disclosure.

FIG. 4 is a schematic diagram illustrating an example apparatus 404 including a transceiver resource 426, a controller 410, and a wirelessly utilizable memory resource 408 in accordance with a number of embodiments of the present disclosure. The example apparatus 404 may be a more detailed example of the wireless memory device 104 and/or the wireless main memory 204 and may be utilizable by other devices such as the network devices 102, 202, and 302. For example, the wirelessly utilizable memory resource 408 may store data that may be directly accessible by the network devices 102, 202, and 302.

A memory resource 408 may include memory (e.g., memory cells) arranged, for example, in a number of bank groups, banks, bank sections, subarrays, and/or rows of a number of memory devices. The memory resource 408 may be DRAM. However, embodiments are not so limited. For example, the memory resource 212 of FIG. 2 may include a plurality of memory devices such as a number of volatile memory devices formed and/or operable as RAM, DRAM, SRAM, SDRAM, and/or TRAM, among other types of volatile memory devices. For example, the memory resource 212 of FIG. 2 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices.

The memory resource 408 may be coupled to the controller 410 via a bus 423 for communicating data between the memory resource and the controller 410. For example, the controller 410 may request particular data values stored in the memory resource 408 and the data values may be retrieved from the memory resource 408 to the controller 410 via the bus 423. For example, the controller 410 may receive instructions retrieved from a wireless memory resource (not shown) and send those instructions to the memory resource 408 via the bus 423.

The controller 410 can comprise control circuitry, in the form of hardware, firmware, or software, or any combination of the three. As an example, the controller 410 can comprise a state machine, a sequencer, and/or some other type of control circuitry, which may be implemented in the form of an application specific integrated circuit (ASIC) coupled to a printed circuit board.

In a number of embodiments, the controller 410 may be configured to communicate, via the transceiver resource 426, data stored in the memory resource 408 via various communication technologies including a device-to-device communication technology that is operable at least in the EHF band, as described in connection with FIG. 2. The data stored in the memory resource may be directly accessible via the device-to-device communication such that the apparatus may be utilizable as a wireless main memory. The transceiver resource 426 may be and/or include a number of radio frequency (RF) transceivers.

Figure 5:
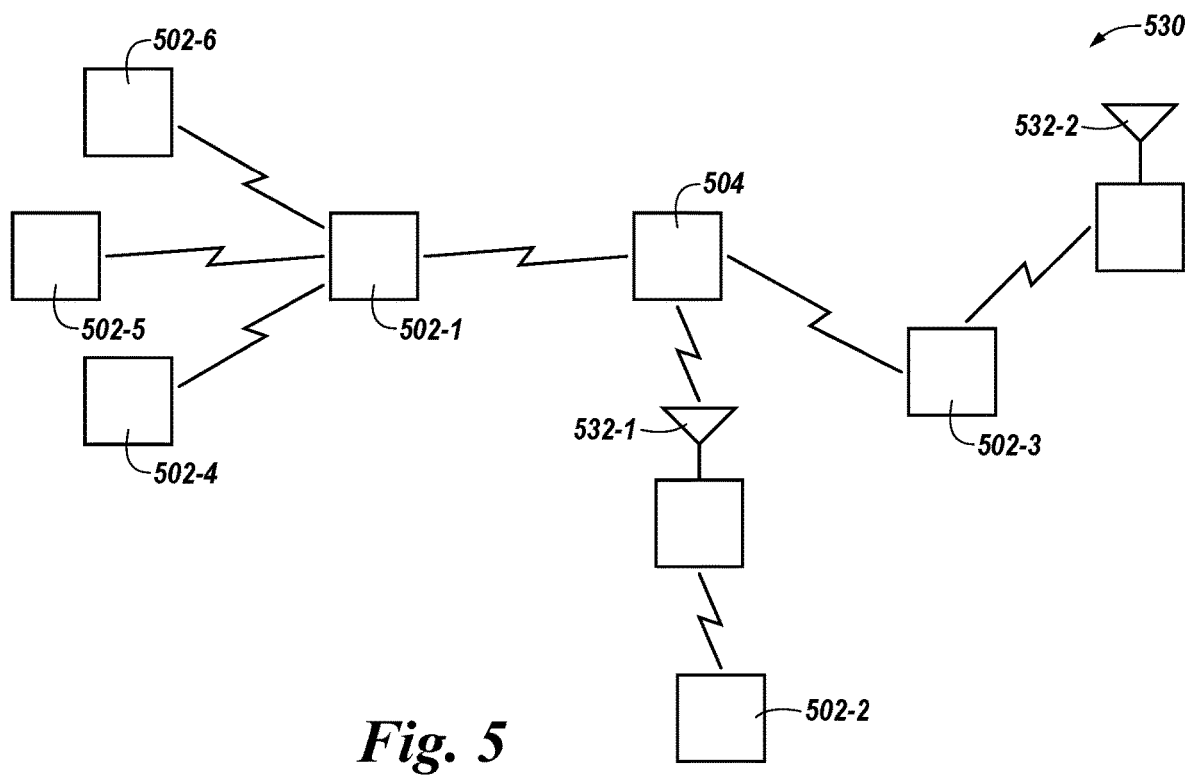
FIG. 5 is a diagram illustrating an example system including a number of network devices and a wireless main memory in accordance with a number of embodiments of the present disclosure.

FIG. 5 is a diagram illustrating an example system 530 including a number of network devices 502 and a wireless main memory 504 in accordance with a number of embodiments of the present disclosure. As illustrated in FIG. 5, the system 530 may, in a number of embodiments, include a plurality of elements. For example, the plurality of elements of the system 530 may be a number of network devices 502 (e.g., IoT enabled devices), a wireless main memory 504, and/or base stations 532-1 and 532-2 (e.g., collectively referred to as base stations 532). Although FIG. 5 describes an individual wireless main memory 504 and two base stations 532, a number of memory devices and a number of base stations the system 530 can include are not limited to a particular amount.

Base stations 532-1 and 532-2 may be connected, via wired or wireless backhaul to a core network (e.g., via an Si interface) or with one another (e.g., via an X2 interface). A core network (not depicted) may be an evolved packet core. A core network may include one more serving gateways, packet data network gateways, mobility management entities, home subscription servers, switches, routers, or the like, coupled with one another via various interfaces to support user and control plane signaling.

In a number of embodiments, the number of network devices 502 may be IoT enabled devices, as described in connection with FIG. 1. For example, the IoT enabled devices can include physical devices, vehicles, home appliances, and other devices embedded with electronics, software, sensors, actuators, and/or network connectivity which enables such devices to connect to a network and/or exchange data. The number of network devices 502 and the wireless main memory 504 include various components, for example, including those described in connection with FIGS. 2, 3, and/or 4.

As shown in FIG. 5, the system 530 can include a plurality of network devices 502 and a wireless main memory 504 coupled to at least a portion of the plurality of network devices 502 such that the wireless main memory is shareable among the portion of the plurality of network devices. The portion of the plurality network devices may be configured to communicate with the wireless main memory via a plurality of communication technologies, and at least one of the plurality of communication technologies may include a communication technology that is operable in a number of frequency bands including the EHF band as well as UHF, SHF, and/or THF bands. As described in connection with FIG. 2, the number of frequency bands may include those frequency bands illustrated in the Release 15 of the 3GPP, as described in connection with FIG. 2.

Various types of communication technologies (e.g., wireless network communication) may be employed within the system 530. The types of communication technologies that can be employed within the system 530 can include a device-to-device communication (e.g., 5G, Bluetooth, Zigbee, etc.), a cellular telecommunication (e.g., 0-5G), and/or other types of wireless network communications such as WiFi (e.g., 802.11-based network communication).

In a number of embodiments, having a wireless main memory 504 within the system 530 that can be commonly shared among the number of network devices 502 can provide benefits such as reducing cost associated with establishing the system 530. As an example, a system associated with utilizing IoT enabled devices may often include a substantial amount of IoT devices operating within the system. As such, having a main memory in each of the number of IoT devices may substantially increase a cost associated with each of the number of IoT devices, which would eventually increase a cost associated with establishing the system. On the other hand, in a number of embodiments, each of the number of IoT devices need not have an internal main memory because a wireless main memory can be commonly shared among the number of IoT devices, which would reduce a cost associated with each of the number of IoT devices. Accordingly, a number of embodiments can reduce cost associated with establishing the system 530.

In an example illustrated in FIG. 5, the wireless main memory 504 is directly coupled to the network devices 502-1 and 502-3 such that the wireless main memory 504 communicates with the network devices 502-1 and 502-3 via a device-to-device communication. A device-to-device communication may utilize the 5G technology. As an example, the device-to-device communication utilizing the 5G technology may be operable in a number of frequency bands including the UHF, SHF, EHF, and/or THF bands, as described in connection with FIG. 2. However, embodiments are not so limited. For example, other device-to-device communication technologies may be employed within the system 530. As an example, at least one of the network device 502-1 and/or 502-3 may communicate with the wireless main memory 504 via a different type of device-to-device communication such as a Bluetooth, Zigbee, and/or other types of device-to-device communications.

In an example described in FIG. 5, the network device 502-3 is further coupled to the base station 532-2. The network device 502-3 may communicate with different network devices (e.g., network devices shown and/or not shown in FIG. 5) via a cellular telecommunication that utilizes the base station 532-2 as an intermediary transceiver.

The term "base station" may be used in the context of mobile telephony, wireless computer networking, and/or other wireless communications. As an example, a base station (e.g., base station 532-1 and/or 532-2) may include a GPS receiver at a known position, while in wireless communications it may include a transceiver connecting a number of other devices to one another and/or to a wider area. As an example, in mobile telephony, a base station may provide a connection between mobile phones and the wider telephone network. As an example, in a computing network, a base station may include a transceiver acting as a router for compute components (e.g., memory resource 312 and processing resource 314) in a network, possibly connecting them to a WAN, WLAN, the Internet, and/or the cloud. For wireless networking, a base station may include a radio transceiver that may serve as a hub of a local wireless network. As an example, a base station also may be a gateway between a wired network and the wireless network. As an example, a base station may be a wireless communications station installed at a fixed location.

In a number of embodiments, the network device 502-3 may utilize the same transceiver (e.g., RF transceiver) for a device-to-device communication (e.g., 5G device-to-device communication) as well as a cellular telecommunication (e.g., 5G cellular telecommunication), as compared to those network devices that utilize separate transceivers for communicating with different types of network devices/entities. As an example, consider a network device that utilizes both a device-to-device communication and a cellular telecommunication (e.g., via a base station) in some approaches. In this example, the network device can include a plurality of transceiver resources (e.g., a plurality of RF transceivers) each specialized for different types of communications (e.g., device-to-device communication and cellular telecommunication) because the device-to-device communication and the cellular telecommunication utilize different network protocols, which would make it necessary to have different transceivers. In contrast, the network devices 502 (e.g., IoT enabled devices) and/or the wireless main memory 504 in accordance with a number of embodiments of the present disclosure need not have a plurality of transceiver resources as the same network protocol (e.g., network protocol for 5G technology) can be utilized for both device-to-device communication and cellular telecommunication.

Accordingly, the network devices 502 and/or the wireless main memory 504 in accordance with a number of embodiments of the present disclosure may include an individual transceiver (e.g., same transceiver) that can be utilized for both the device-to-device communication and the cellular telecommunication, which would provide benefits such as a reduced design complexity of the network devices 502, and thereby reducing cost associated with manufacturing the network devices 502. As an example, the wireless main memory 504 may utilize the same network protocol in communicating with the network device 502-2 (e.g., via a cellular telecommunication technology through the base station 532-1) as well as with the network devices 502-1 and/or 502-3 (e.g., via a device-to-device communication technology).

In a number of embodiments, various types of network protocols may be utilized for communicating data within the system 530 (e.g., among the network devices 502, between the network devices 502 and the wireless memory device, between the network devices 502 and the base stations 532, etc). The various types of network protocols may include the time-division multiple access (TDMA), code-division multiple access (CDMA), space-division multiple access (SDMA), frequency division multiple access (FDMA), orthogonal FDMA (OFDMA), single-carrier (SC)-FDMA, and/or non-orthogonal multiple access (NOMA), although embodiments are not so limited.

In an example illustrated in FIG. 5, the wireless main memory 504 is indirectly coupled to the network devices 502-4, 502-5, and 502-6, which may utilize (e.g., share), via the network device 502-1, the wireless main memory 504. The network device 502-2 may be coupled to the wireless main memory 504 indirectly via a base station 532-1. Accordingly, a communication technology utilized for a communication between the network device 502-2 and the base station 532-1 may be a cellular telecommunication technology (e.g., 5G cellular telecommunication) that is operable in a number of frequency bands including the EHF band.

The network devices 502-4, 502-5, and 502-6 may be coupled to the wireless main memory 504 via the network device 502-1. Accordingly, the system 530 may also include, for example, a multi-hop network, in which data are routed from a source node to a destination node via a number of intermediary nodes (e.g., intermediary devices such as the network device 502-1). As an example, the data may be retrieved from at least one of the network devices 502-4, 502-5, and/or 502-6, and may be transmitted, via a device-to-device communication, to the network device 502-1, which may further route the retrieved data to the wireless main memory 504.

In some embodiments, cellular telecommunication technologies (e.g., between the wireless memory device 504 and the network device 502-2) may be performed via (e.g., include) a NOMA. As used herein, the NOMA refers to a network protocol that separates signals according to a power domain. For example, signals may be received (e.g., from the user) in an intentionally-introduced mutual interference and can be separated from each other based on differences on their power levels. As such, the signals received and to be processed pursuant to the NOMA may be non-orthogonal in time, frequency, and/or code, as compared to those orthogonal multiple-access (OMA) schemes, in which different users are allocated according to orthogonal resources, either in time, frequency, and/or code domain. Accordingly, utilizing a non-orthogonal network protocols such as the NOMA may provide benefits such as reduced latencies associated with separating users based on factors other than power domain, which may enable massive Multiple Input Multiple Output (MIMO).

Figure 6:
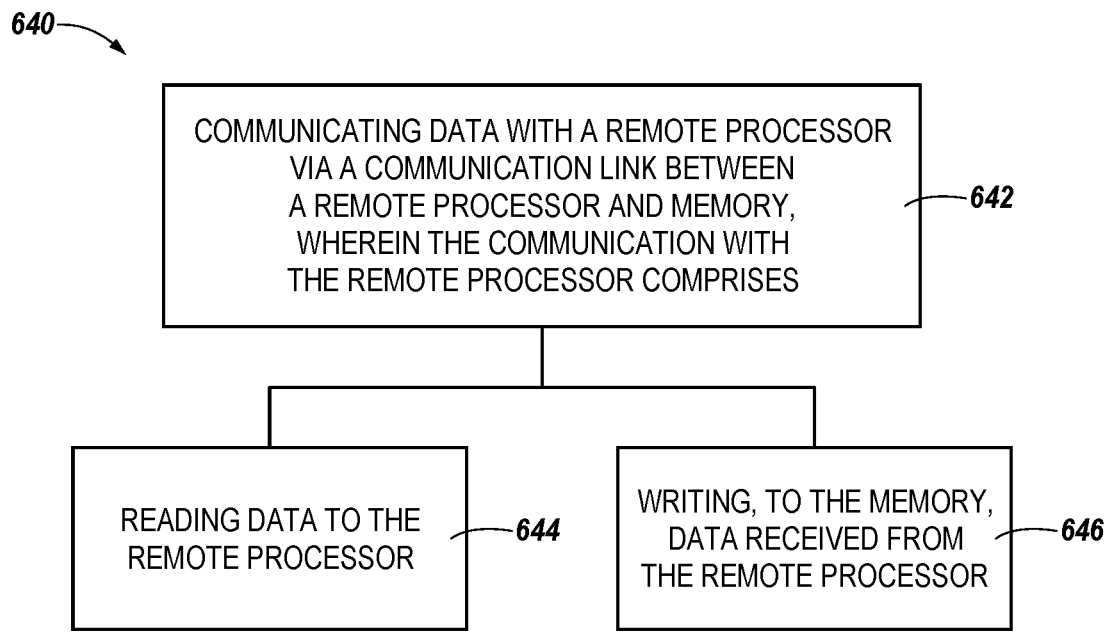
FIG. 6 is a flow chart illustrating an example of a method for communication between wirelessly utilizable memory resource and remote processor in accordance with a number of embodiments of the present disclosure.

FIG. 6 is a flow chart illustrating an example of a method 640 for communication between wirelessly utilizable memory resource and remote processor in accordance with a number of embodiments of the present disclosure. Unless explicitly stated, elements of methods described herein are not constrained to a particular order or sequence. Additionally, a number of the method embodiments, or elements thereof, described herein may be performed at the same, or at substantially the same, point in time.

At block 642, the method 640 may include communicating data with a remote processor via a communication link between a remote processor and memory. The remote processor and memory can be analogous to the processing resource 214 and 314, and the memory resource 208 and 408, respectively, as described herein.

In some embodiments, the communication link can be a device-to-device communication link in a number of frequency bands including a SHF band. Although embodiments are not so limited, the communication link may be within a shared frequency band. In this example, the method 640 may, in some embodiments, include contending an access to time and frequency resources within the shared frequency band.

The device-to-device communication link may utilize the 5G technology, as described herein. As an example, the device-to-device communication link utilizing the 5G technology may be operable in a number of frequency bands including the UHF, SHF, EHF, and/or THF bands, as described in connection with FIG. 2. However, embodiments are not so limited. For example, other device-to-device communication technologies can be employed. As an example, the device-to-device communication link can be of a different type of device-to-device communication technology such as a Bluetooth, Zigbee, and/or other types of device-to-device communication technologies.

At block 644, the method 640 may include reading data to the remote processor. In some embodiments, reading the data to the remote processor may include retrieving, responsive to receiving a command from the remote processor, data stored in the memory, and transmitting, via the communication link in the EHF band, the retrieved data to the remote processor. At block 646, the method 640 may include writing, to the memory, data received from the remote processor.

Figure 7:
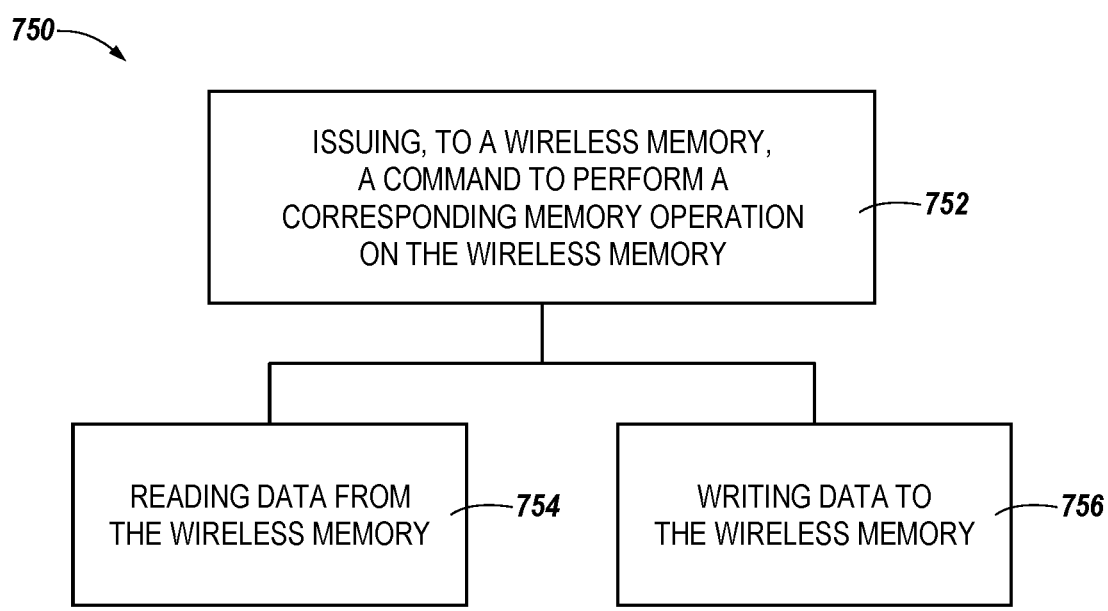
FIG. 7 is a flow chart illustrating an example of performing operations on a wirelessly utilizable memory resource in accordance with a number of embodiments of the present disclosure.

FIG. 7 is a flow chart illustrating an example of method 750 for performing operations on a wirelessly utilizable memory resource in accordance with a number of embodiments of the present disclosure. Unless explicitly stated, elements of methods described herein are not constrained to a particular order or sequence. Additionally, a number of the method embodiments, or elements thereof, described herein may be performed at the same, or at substantially the same, point in time.

At block 752, the method 750 may include issuing, to a wireless memory, a command to perform a corresponding memory operation on the wireless memory. The wireless memory can be analogous to the memory resource 208 and 408, respectively, as described herein. In some embodiments, the command can be issued from a remote processor (e.g., processing resource 214 and 314) that is coupled to the wireless memory via a communication link.

The command may be communicated to the wireless memory on a communication link in the EHF band. As described herein, a communication technology utilizing the communication link in the EHF band can include a 5G technology or later technology. 5G technology may be designed to utilize a higher frequency portion of the wireless spectrum, including an EHF band (e.g., ranging from 30 to 300 GHz as designated by the ITU). However, embodiments are not so limited. For example, the various types of communication technologies of the communication link may include cellular telecommunication including different generations of broadband cellular telecommunication technologies, device-to-device to communication including Bluetooth, Zigbee, and/or 5G (e.g., device-to-device communication operable in an EHF band), and/or other wireless communication utilizing an intermediary device (e.g., WiFi utilizing an AP).

At block 754, the method 750 may include reading data from the wireless memory. In some embodiments, the wireless memory can be a wireless main memory. In this example, reading the data from the wireless memory as described at block 754 may further include retrieving a set of instructions stored in the wireless memory, and executing, by a processor coupled to the wireless main memory via the communication link, the retrieved set of instructions. In some embodiments, the method 750 may include storing, while the set of instructions are being executed by the processor, the retrieved set of instructions in a cache coupled to the processor. At block 756, the method 750 may include writing data to the wireless memory.

As described herein, the remote processor can be in different statuses. For example, the method 750 may include (e.g., remote processor) entering periodically in to a first status to perform the corresponding memory operation on the wireless memory. The method 750 may further include (e.g., remote processor) entering into a second status when not in the first status. In some embodiments, a nominal power consumption of the second status can lower than a nominal power consumption of the first status.

In the above detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically for access to and/or for movement (transmission) of instructions (e.g., control signals, address signals, etc.) and data, as appropriate to the context. The terms "data" and "data values" are used interchangeably herein and may have the same meaning, as appropriate to the context (e.g., one or more data units or "bits").

While example embodiments including various combinations and configurations of memory resources, processing resources, transceiver resources, memory devices, controllers, base stations, infrastructure, and switches, among other components for wirelessly utilizable memory devices have been illustrated and described herein, embodiments of the present disclosure are not limited to those combinations explicitly recited herein. Other combinations and configurations of the memory resources, processing resources, transceiver resources, memory devices, controllers, base stations, infrastructure, and switches for wirelessly utilizable memory devices between selected memory resources disclosed herein are expressly included within the scope of this disclosure.

Although specific embodiments have been illustrated and described herein, those of ordinary skill in the art will appreciate that an arrangement calculated to achieve the same results may be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a main memory configured to wirelessly communicate via cellular telecommunication; and
   the main memory configured to operate as a remote main memory for a host processor via the cellular telecommunication;
   wherein the main memory is configured to communicate with the host processor on a sidelink within a licensed frequency band on time and frequency resources scheduled via downlink control signaling from a base station.

2. The apparatus of claim 1, wherein data communicated between the main memory and the host processor via the cellular telecommunication are indirectly communicated through the base station.

3. The apparatus of claim 1, wherein data stored in the main memory and to be accessed by the host processor are directly communicated between the main memory and the host processor without transferring through the base station.

4. The apparatus of claim 1, wherein the main memory is configured to select one of a number of frequency bands based on a distance between the main memory and the host processor.

5. The apparatus of claim 1, wherein a network protocol utilizable for the cellular telecommunication includes a non-orthogonal multiple access (NOMA) protocol.

6. The apparatus of claim 1, wherein the main memory is configured to utilize the cellular telecommunication for an enhanced mobile broadband (eMBB).

7. The apparatus of claim 1, wherein the main memory is configured to utilize the cellular telecommunication for massive machine-type communications (mMTC).

8. The apparatus of claim 1, wherein the main memory is configured to utilize the cellular telecommunication for ultra-reliable and low-latency communications (URLLC).

9. A system, comprising:
a network device comprising a host processor; and
a main memory configured to wirelessly communicate with the host processor via cellular telecommunication within a licensed frequency band, wherein the main memory is configured to operate as a remote main memory for the network device;
wherein the main memory is configured to communicate, via the cellular telecommunication, with the network device on a sidelink within the licensed frequency band on time and frequency resources scheduled via downlink control signaling from a base station.

10. The system of claim 9, wherein the network device lacks an internal main memory.

11. The system of claim 9, wherein the main memory is configured to wirelessly communicate with the network device on frequency resources of a channel bandwidth equal to or greater than 50 megahertz (MHz).

12. The system of claim 9, wherein the main memory comprises a dynamic random access memory (DRAM).

13. A system, comprising:
a plurality of network devices; and
a main memory configured to operate as a remote main memory for the plurality of network devices, the main memory further configured to wirelessly communicate, via cellular telecommunication, data with one or more of the plurality of network devices on a sidelink within a licensed frequency band on time and frequency resources scheduled via downlink control signaling from a base station.

14. The system of claim 13, wherein one or more of the plurality of network devices includes internet-of-things (IoT) devices.

15. The system of claim 13, wherein the main memory is configured to communicate, via the cellular telecommunication, data directly to one or more of the plurality of network devices on the time and frequency resources scheduled via downlink control signaling from the base station.

16. The system of claim 13, wherein the main memory is configured to:
communicate, via the cellular telecommunication, data to one or more of the plurality of network devices through the base station on the time and frequency resources scheduled via downlink control signaling from the base station.

17. The system of claim 13, wherein the main memory is configured to:
communicate, via the cellular telecommunication, data directly to a first network device of the plurality of network devices; and
communicate, via the cellular telecommunication, data indirectly to a second network device of the plurality of network devices;
wherein a same network protocol is utilized in communicating with the first network device and the second network device.

18. The system of claim 17, wherein the network protocol includes a non-orthogonal multiple access (NOMA) protocol.

* * * * *